United States Patent [19]
Skoyles

[11] 3,724,914
[45] Apr. 3, 1973

[54] ANTI-LOCK BRAKE SYSTEMS

[75] Inventor: Derek Robert Skoyles, East Grinstead, England

[73] Assignee: U.S. Philips Corporation, New York, N.Y.

[22] Filed: Jan. 5, 1972

[21] Appl. No.: 215,622

Related U.S. Application Data

[63] Continuation of Ser. No. 881,460, Dec. 2, 1969.

[30] Foreign Application Priority Data

Dec. 13, 1968 Great Britain.....................59,524/68

[52] U.S. Cl. ...............303/21 F, 188/181 A, 303/10, 303/61
[51] Int. Cl. ...............................................B60t 8/02
[58] Field of Search..........188/181; 303/21 F, 21 AF, 61–63, 303/68–69, 10

[56] References Cited

UNITED STATES PATENTS

| | | | |
|---|---|---|---|
| 3,276,822 | 10/1966 | Lister et al. ......................303/21 F X |
| 3,514,162 | 5/1970 | Erlebach et al. ................303/21 F X |
| 3,521,934 | 7/1970 | Leiber................................303/21 F |
| 3,524,684 | 8/1970 | Skoyles..............................303/21 F |

Primary Examiner—Milton Buchler
Assistant Examiner—John J. McLaughlin
Attorney—Frank R. Trifari

[57] ABSTRACT

An anti-lock brake system having a wheel speed sensor and related electrical control unit for energizing a solenoid valve to divert brake fluid to a reservoir in response to wheel deceleration in excess of a predetermined value. The diverted fluid displaces a plunger and restrictor member attached thereto; the restrictor being extended into a section of the pressure line to restrict flow therethrough.

14 Claims, 11 Drawing Figures a b c d

ANTI-LOCK BRAKE SYSTEMS

This is a continuation of application Ser. No. 881,460, filed Dec. 2, 1969.

This invention relates to anti-lock brake systems for wheeled vehicles, that is systems designed to improve braking performance by relieving braking pressure applied to a wheel if the wheel tends to lock on a slippery surface following a braking action by a driver and than increasing the braking pressure again without the need for any change in the action of the driver. Such systems can be successful in reducing the risk of skidding due to wheel lock and in maintaining directional control during braking, and can also reduce braking distances.

Anti-lock brake systems can be hydraulic or air operated systems for application to different kinds of vehicle. Hydraulic brake systems can be of the master cylinder type with or without vacuum or air pressure servo amplifiers, or of the continuously pumped type. Air and air/hydraulic brake systems are usually of the continuously pumped type.

The relieving of braking pressure applied to a wheel can be effected in a variety of ways, depending on the type of anti-lock brake system. For example, in the case of a continuously pumped hydraulic brake system in which fluid, pumped continuously to supply circulation of fluid under pressure, is fed to a wheel brake to an extent determined by operation of a brake pedal by a driver, the relieving of braking pressure may be effected by mechanically actuating a control valve connected to or in a pressure line feeding the brake to divert some of the fluid from the brake. Similarly, in the case of a master cylinder type hydraulic brake system in which fluid in a hydraulic pressure line feeding the brake is pressurized by actuation of the master cylinder piston consequent upon operation of a brake pedal by a driver, the relieving of braking pressure may be effected by mechanically actuating a control valve connected to or in the hydraulic pressure line to divert fluid from the brake. In another master cylinder type hydraulic brake system, a control valve in a hydraulic pressure line feeding a brake may be fluid (air) pressure actuated to divert fluid from the brake. The instant when braking pressure is to be relieved can be determined by a first criterion related to wheel rotational movement, for example, wheel deceleration being in excess of a predetermined value: that is, when the wheel decelerates at a rate that is likely to cause skidding. The value of braking pressure that exists to cause said first criterion to obtain will be hereinafter referred to as "the locking value." The period (hereinafter referred to as an "anti-lock period") during which the braking pressure continues to be relieved can be determined by a second criterion related to subsequent wheel rotational movement arising from relieving the braking pressure, for example, when the wheel has reached the speed it would have been doing if it had continued to decelerate at said predetermined value from the speed obtaining when braking pressure was relieved. At the end of the anti-lock period, braking pressure is increased again up to a locking value. This cycle of operation from the instant when braking pressure is relieved to the time when the braking pressure is increased again up to the locking value will be hereinafter referred to as an "anti-lock cycle" and is repeated each time said first criterion is reached.

There is no further anti-locking and driver-controlled braking pressure is restored once said first criterion no longer prevails.

According to the present invention there is provided an anti-lock brake system in which braking pressure is increased at the end of an anti-lock period at a rate which is controlled. In experiments with different designs of anti-lock brake systems, such control has been found to be important in attempting to obtain improved performance.

In carrying out the invention, the rate at which braking pressure is increased at the end of an anti-lock period is preferably controlled in dependence on the volume of fluid which is displaced when braking pressure is relieved during anti-locking. Such volume of fluid can be in respect of either the current anti-lock period or the current anti-lock period and at least one preceding anti-lock period.

Also in carrying out the invention, the braking pressure may be increased at the end of an anti-lock period at a steady initial rate towards locking value, or it may be increased at a first, relatively high, rate up to an intermediate value and then at a second, slower, rate up to the locking value. In the latter case it can also be arranged that said intermediate value depends on the duration of the anti-lock period. Furthermore, a final portion of the second, slower, rate may be dependent on wheel deceleration.

In further considering the nature of the invention reference will now be made by way of example to the accompanying drawings of which:

Figure 1:
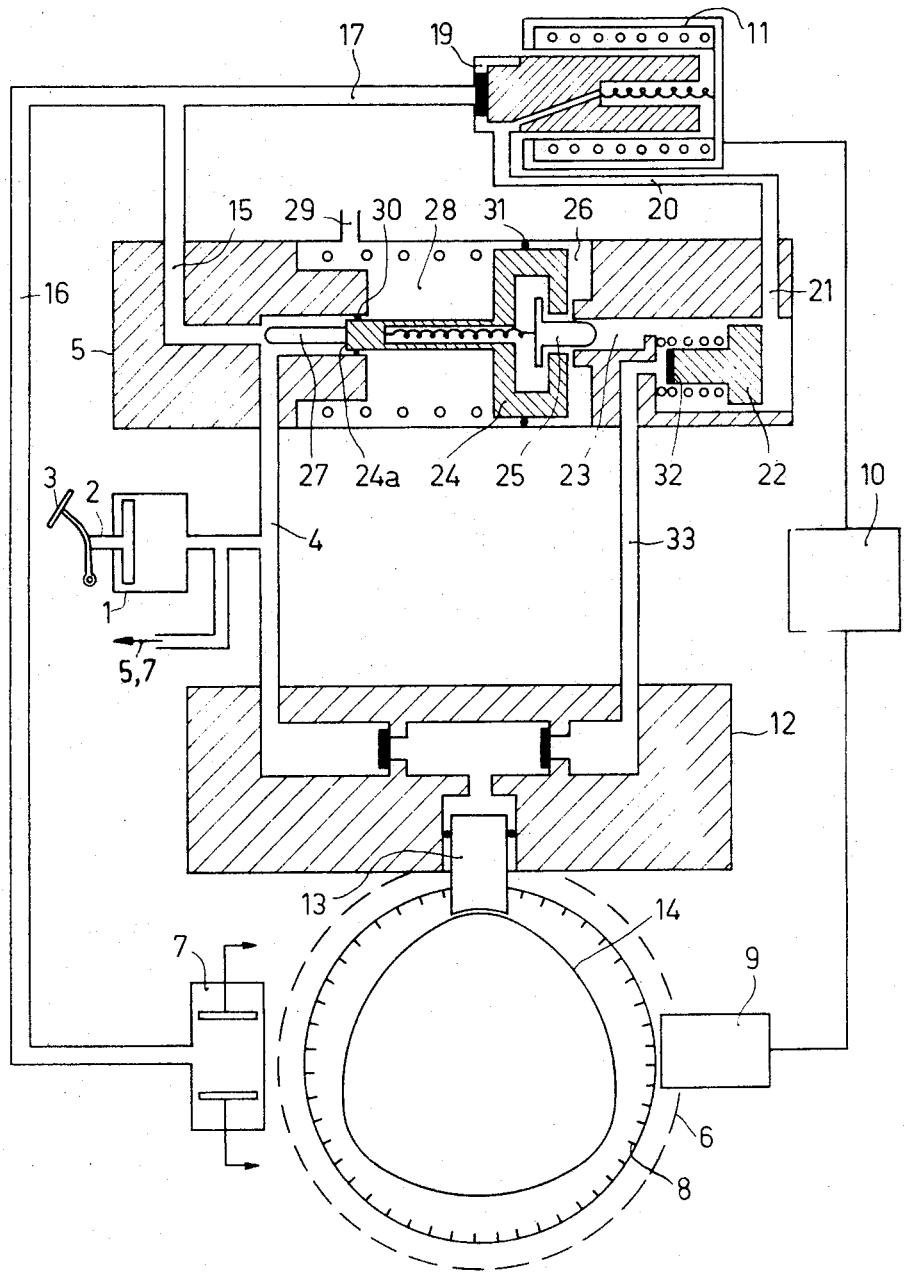
FIG. 1 shows diagrammatically an anti-lock brake system conforming to the invention.
Figure 2:
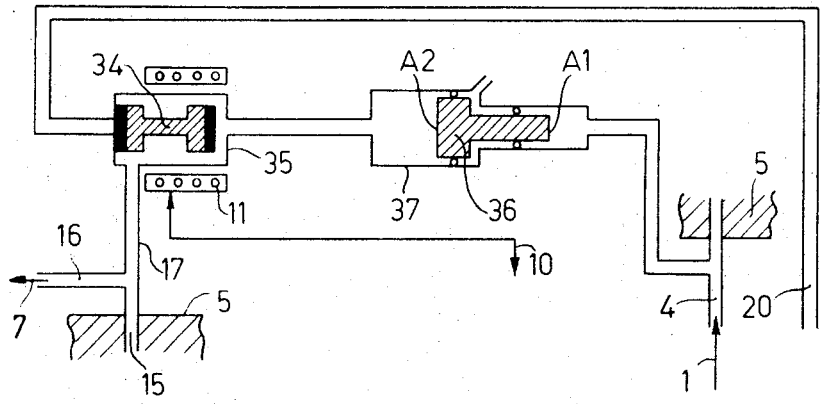
FIG. 2 shows diagrammatically a first modification for the system of FIG. 1.
Figure 3:
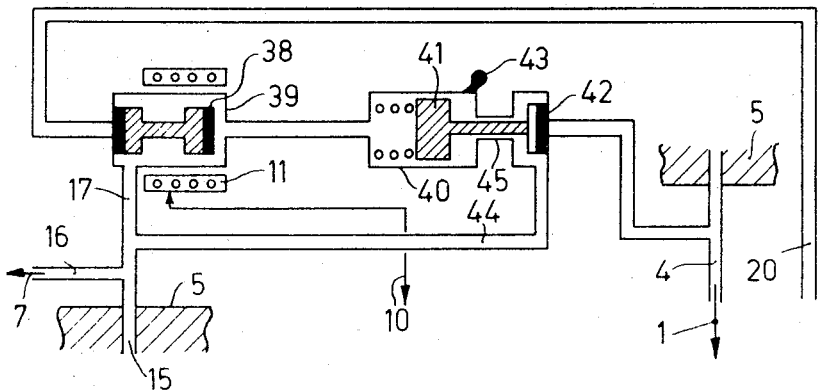
FIG. 3 shows diagrammatically a second modification for the system of FIG. 1.
Figure 5:
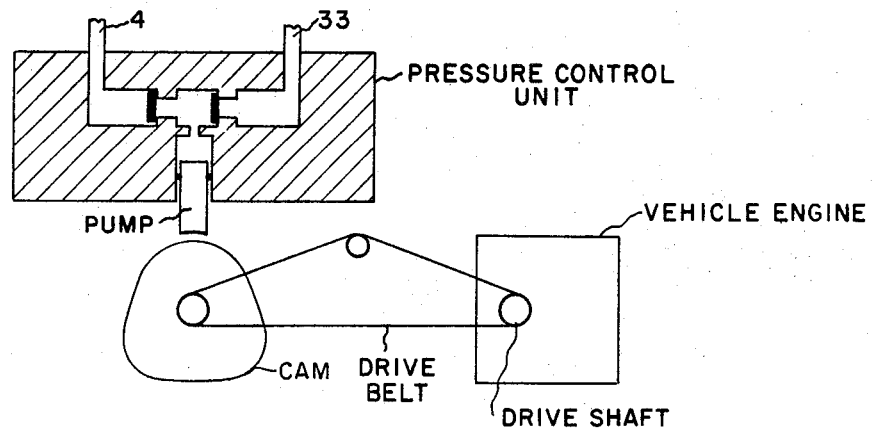
Figure 6:
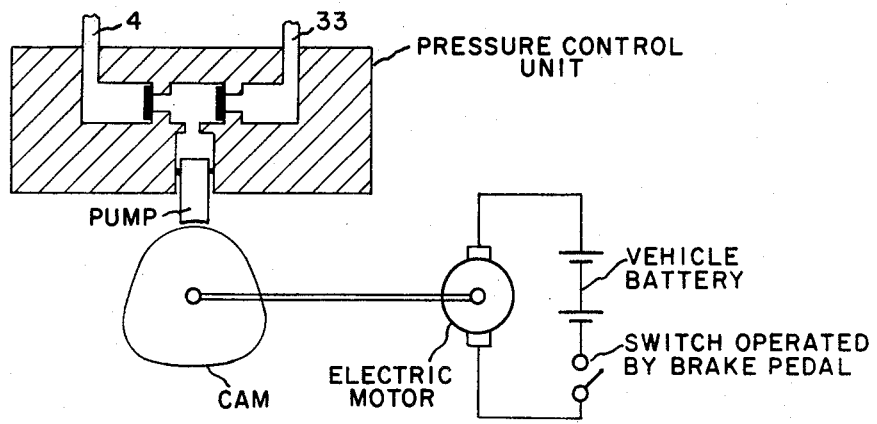
Figure 7:
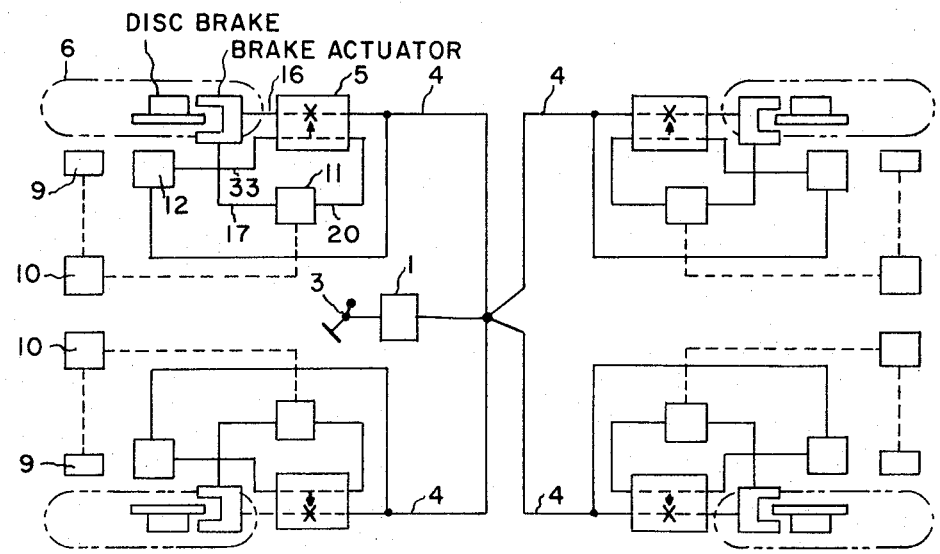
Figure 8:
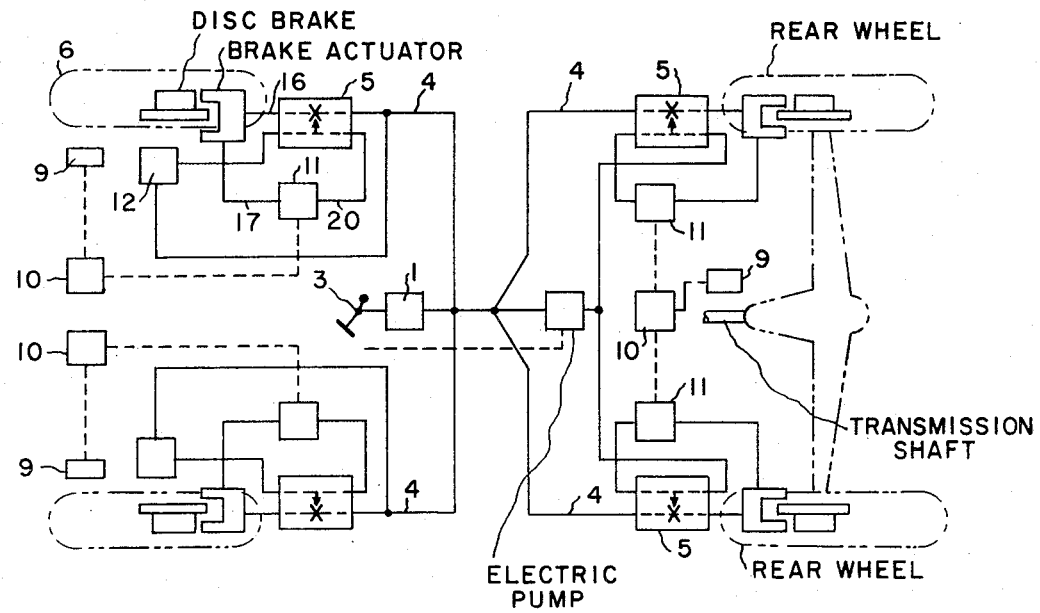

FIGS. 4a, 4b, 4c, and 4d show diagrammatic braking pressure/time waveforms which are illustrative of the operation of FIGS. 1 to 3;

FIG. 5 schematically shows the pump driven by the vehicle engine;

FIG. 6 shows the pump driven electrically;

FIG. 7 schematically shows the anti-lock brake system of FIG. 1 as applied to each of the wheel brakes of a vehicle; and FIG. 8 shows the system of FIG. 1 as applied to each of the front wheels of a vehicle and a single system provided jointly fro both rear wheels.

Referring to FIG. 1, the anti-lock brake system there shown diagrammatically is a master cylinder type hydraulic system comprising a master cylinder 1 having a piston 2 which is actuable by a foot brake pedal 3. The master cylinder 1 is connected via a hydraulic pressure line 4 to a brake pressure control unit 5 which is provided in respect of a wheel represented by a dotted line circle 6. Associated with the wheel 6 is a hydraulic brake 7 which may be of the disc or drum type. There is also associated with the wheel 6 a wheel speed sensor for producing electrical signals related to wheel speed. In FIG. 1, this wheel speed sensor is exemplified by a ferro-magnetic toothed disc 8 which rotates with the wheel 6 and co-operates with an electro-magnetic pick-up 9 to produce electrical signals the frequency of which is proportional to wheel speed.

These signals are applied to an electrical control unit 10. The system also includes a solenoid 11 which is energizable by the electrical control unit 10, and a scavenging pump 12 having a piston 13 which is driven by a cam 14 that rotates with the wheel 6.

When the master cylinder piston 2 is actuated by the foot brake pedal 3, fluid in the pressure line 4, a bore 15 of the control unit 5 and a pressure line 16 leading to the brake 7 is pressurized. This produces braking pressure in the brake 7. Fluid in a pressure line 17 leading to the solenoid 11 is also pressurized at this time.

The electrical control unit 10 is responsive to energize solenoid 11 when the signals applied to it signify that a first criterion obtains such as wheel deceleration (due to braking) being in excess of a predetermined value (for example in excess of 1g). When energized, the solenoid valve 19 is displaced from between the pressure line 17, and a further pressure line 20. As a result, some of the fluid under pressure in the pressure line 4, bore 15 and pressure lines 16 and 17 is diverted into pressure line 20 to relieve braking pressure.

The solenoid 11 remains energized to hold open its valve 19 for a period determined by the electrical control unit 10 in dependence on a second criterion, as aforesaid, related to subsequent wheel rotational movement arising from relieving the braking pressure. During this period (the anti-lock period) which is short compared with the period of a complete anti-lock cycle, a burst of fluid pressure is introduced into a bore 21 of the control unit 5 and applied behind a spring-loaded plunger 22. This fluid pressure causes this plunger 22 to move to the left (as seen in the drawing) against its spring-loading, and it also causes fluid under pressure to be forced between the edges of the plunger 22 and the juxtaposed walls of its enclosure into a bore 23 formed in the control unit 5.

The fluid pressure in bore 23 is applied behind a main spring-loaded plunger 24, a spring-loaded stud 25 on the plunger 24 being initially displaced by the fluid pressure so that there is a rapid build-up of fluid pressure behind the plunger 24 in a reservoir 26. As the main plunger 24 moves to the left (as seen in the drawing) under the fluid pressure, restrictor 27 carried on or forming part of the plunger enters the bore 15, thereby restricting flow of fluid through this bore to the line 16 to allow the braking pressure to be relieved. The region 28 into which the plunger 24 is moved by the fluid pressure behind it is open to atmosphere through a vent 29. The region 28 is sealed from the hydraulic parts of the control unit 5 by means of O-rings 30 and 31 provided on the plunger 24. As the plunger 24 moves to the left the reservoir 26, in effect expands into the region 28.

The displacement of the spring-loaded plunger 22 to the left causes a valve 32, carried by it, to seal a pressure line 33 from the bore 23, so that all the fluid entering bore 23 goes into the reservoir 26 at this time. The plunger 22 is restored by its spring-loading to its normal position when the fluid pressure behind it is sufficiently reduced, consequent upon subsequent de-energization of the solenoid 11. When this happens, the bore 23 is interconnected with line 33 again and the pump 12 pumps fluid from the reservoir 26 into the master cylinder pressure lines 4 at a rate determined by the speed of rotation of the wheel 6. This causes the pressure of fluid in the reservoir 26 to fall, so that the main plunger 24 moves to the right under its spring-loading and pressure on area 24a, thereby withdrawing the restrictor 27 at least partially from the bore 15 with the result that the rate of pressure build-up of the fluid in line 16 is increased. This causes an increase in braking pressure up to the locking value, when the anti-lock cycle is completed. The anti-lock cycle is thereafter repeated until the electrical control unit 10 is no longer responsive to the electrical signals applied to it to energize the solenoid 11. Fluid pressure in bore 15 and pressure line 16 then will eventually restore to the pressure in line 4, as produced by the master cylinder 1, in response to operation of the foot brake pedal 3.

In the operation of the system as described above, it is to be understood that once the restrictor 27 has been inserted into the bore 15 in the first anti-lock cycle, it may thereafter be maintained in the bore 15 for subsequent anti-lock cycles of an anti-lock braking action. Furthermore, it can be seen that the restrictor 27 is inserted into the bore 15 as a result of fluid which is displaced when braking pressure is relieved and that the extent by which the restrictor 27 extends into the bore 15 is related to the volume of fluid which is displaced, that is, by how much the reservoir 26 is filled by the displaced fluid. The effect of this on the braking pressure applied to wheel 6 is illustrated diagrammatically in FIG. 4a. Assuming that during an anti-lock period $t1$ to $t2$ (i.e. the period during which solenoid 11 is energized), braking pressure has been relieved from P1 to an unlocking value P2a, then for a given volume of displaced fluid, the rate at which the braking pressure is increased again until it attains a locking value P3 at time $t3$ may be given by the slope $s1$. However, if a lesser volume of fluid is displaced to an unlocking value P2b then the restrictor 27 will not have extended so for into bore 15, with the result that the braking pressure will attain the locking value P3 in loss time $t4$ at a rate given by the slope $s2$. Conversely, if a greater volume of fluid is displaced to an unlocking value P2c then the restrictor 27 will have extended further into the bore 15, with the result that the braking pressure will not attain the locking value P3 until a longer time $t5$.

Since the volume of displaced fluid is determined by the period during which the solenoid 11 is energized, which in turn is determined by said first and second criteria related to rotational movement of the wheel 6, it would seem to follow that the rate at which braking pressure is increased again following an anti-lock period will always be governed by prevailing road surface conditions. Thus, in conditions of good road adhesion, there will be less tendency for the wheel to lock so that the anti-lock period will be short and thus the rate at which braking pressure is increased again can be high without risk of re-locking the wheel. Conversely, in condition of bad road adhesion there will be more tendency for the wheel to lock so that the anti-lock period will be longer and thus the rate at which braking pressure is increased is lower, as there is a greater risk of the wheel relocking.

However, in practice, the rate at which braking pressure is increased again is governed by a prevailing road surface condition only in the first anti-lock cycle of an anti-lock braking action when the condition occurs, the rate in subsequent anti-lock cycles being adjusted by the system to a value which maybe substantially the same for all road surface conditions. This includes the case when a prevailing road condition changes during an anti-lock braking action in which case the rate in the next anti-lock cycle may change accordingly but would be adjusted again by the system to said value in the subsequent anti-lock cycles.

Figure 4:
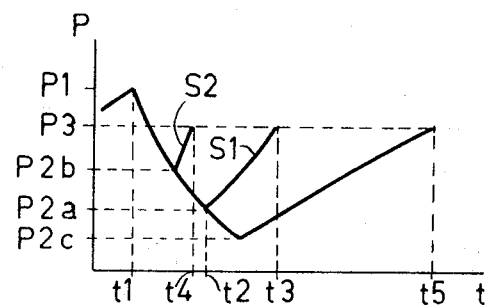
Figure 4:
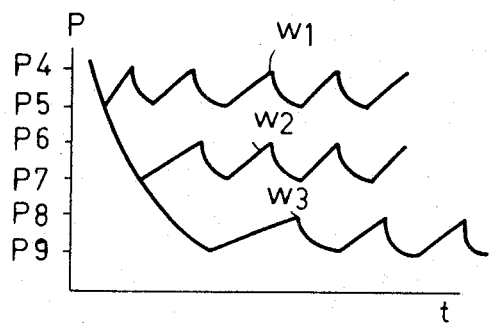
Figure 4:
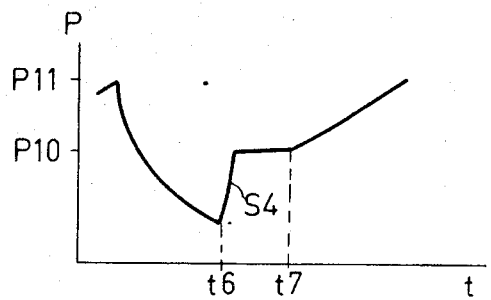
Figure 4:
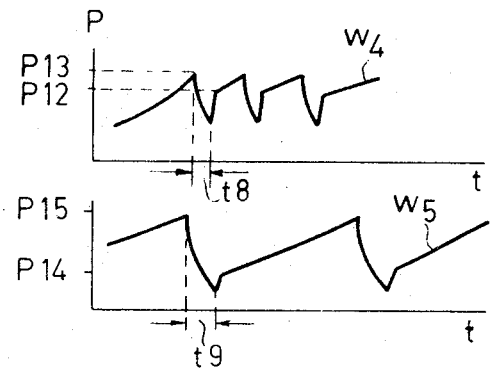

This practical aspect is due to the fact that both the unlocking value and the locking value of braking pressure will vary with different road surface conditions so that after the first anti-lock cycle the actual percentage change between the unlocking and locking values may not vary greatly for different pressure ranges in each instance. Thus, for any one value of master cylinder pressure the anti-lock period in subsequent anti-lock cycles will tend to approximate to the same duration to maintain the rate the same in each cycle. Also, the amount of displaced fluid in the reservoir 26 will tend towards a mean volume under the influence of the scavenging pump 12 in subsequent anti-lock cycles to control the positioning of the restrictor 27 in bore 15. FIG. 4b illustrates diagrammatically braking pressure/time waveforms of a number of anti-lock cycles, waveform w1 showing relatively high locking and unlocking values of pressure (P4 and P5) due to good conditions of road adhesion, waveform w2 showing somewhat lower values of locking and unlocking pressures (P6 and P7) due to, say, average conditions of road adhesion and waveform w3 showing relatively low locking and unlocking values of pressure (P8 and P9) due to poor conditions of road adhesion. In these waveforms, it is seen that the difference between locking and unlocking values of pressure is over a different pressure range in each case, but that both the rate of pressure increase and the period of the anti-lock cycles after the first cycle are nearly the same in each waveform. This assumes rapid action of the scavenging pump 12. Also, these waveforms assume that the initial locking pressure is on very good conditions of road adhesion which then deteriorates to varying extents for the three waveforms.

In the system as so far described, there may be fluctuations in its "ideal" performance as illustrated by the waveforms shown in FIG.4b, such fluctuations being due to momentary changes in road adhesion or brake characteristics and giving rise to sudden changes in locking and unlocking values of pressure with a consequent change in the rate at which braking pressure is increased again at the end of an anti-lock period. In order to compensate at least in part for these fluctuations by ensuring that said rate does not suddenly increase but remain initially steady at a controlled value, the stud 25 on plunger 24 can be of sufficient length so as to extend into the bore 23 to form a restriction therein to restrict flow of fluid from the reservoir 26 to the pump 12 so that fluid cannot be so readily pumped from the reservoir 26. The result is to provide a damping action tending to slow down withdrawal of the restrictor 27 from bore 15 after a minimum penetration of this restrictor into this bore. The degree of damping may be such as to select a maximum initial rate of braking pressure increase throughout a series of anti-lock cycles, this maximum initial rate being determined by the length of stud 25 plus the extent of displacement of the plunger 24 due to fluid displaced from the brake as caused by relieving braking pressure.

The plunger 22 with its valve 32 provide in the system of FIG. 1 a "fail-safe" feature in that when the solenoid 11 is energized the pump 12 cannot extract fluid from the reservoir 26 due to the closure of the pressure line 33 by the valve 32 when the plunger is displaced to the left. This "fail-safe" feature does not prevent normal operation of the pump 12 as the valve 32 closes the pressure line 33 only for the relatively short anti-lock period in each anti-lock cycle. However, in the event of a fault such as to cause the solenoid 11 to remain permanantly energized, the pump 12 is prevented from pumping displaced fluid from the reservoir 26, thereby allowing braking pressure to gradually build-up to the master cylinder value. Without the fail-safe feature, the pumping action of pump 12 would so reduce fluid in reservoir 26 that plunger 24 assumes a position in which the restrictor 27 is so positioned in the bore 15 that input of fluid from the master cylinder is balanced by the fluid input to the scavenging pump, resulting in braking pressure being equal only to pump input pressure, which is low. With the fail-safe feature, the master cylinder pressure eventually acts via lines 17 and 20 and bore 21 to lock plunger 22 in the displaced position when the reservoir 26 is full.

During normal anti-lock cycles of a braking action, the plunger 22 also contributes to the feature of relieving braking pressure in two steps, in that when it is initially displaced to the left to seal off the reservoir 26 from the pump 12, it causes an immediate volume of fluid to be displaced into the reservoir 26 to move plunger 24 to cause immediate additional insertion of the restrictor 27 into the bore 15. Thereafter, further insertion of the restrictor 27 into bore 15 is slowed up because further fluid has to pass into the reservoir 26 through the gap between the edge of the plunger 22 and the wall of its enclosure. This latter feature provides relieving of braking pressure at a first high rate to permit immediate unlocking of the wheel 6, followed by a second slower rate to the "unlocking value" that defines the end of an anti-lock cycle.

In the system of FIG. 1 the solenoid 11 may, instead of providing an open/close actuation of the valve 19, as described above, have characteristics such that it will actuate valve 19 as a pressure relief valve, the opening value thereof being dependent on solenoid current and set such that at zero current it will remain closed at the maximum braking pressure of the system but will fully open when energizing current is applied to it for a time greater than a certain minimum. Such a solenoid would provide a fluid pressure leak path between pressure lines 17 and 20 at a time immediately before each anti-lock cycle to cause a slight relieving of braking pressure at this time. The effect of this would be to "tail-off" the rate of braking pressure increase between one anti-lock cycle and the next. The progressive energization of the solenoid to provide the leak may be determined by the electrical control unit 10, in dependance on deceleration of the wheel 6.

Another modification of the system of FIG. 1 can be the provision of means causing the braking pressure to be increased at the end of an anti-lock period at first, relatively high rate up to an intermediate value and then at a second slower rate up to the locking value. One arrangement for achieving this is shown in FIG. 2, the elements in which are connected, as indicated, to the pressure lines 4, 17 and 20. In this arrangement the solenoid 11 acts on a two-way control valve 34 located in a housing 35 and there is provided a differential piston 36 which is located in a cylinder 37 that is connected with the housing 35 between the master cylinder 1 and brake 7. The differential piston 36 is displaced to the right in cylinder 37 when the fluid in bore 15 and lines 16 and 17 is pressurized by master cylinder actuation.

When the solenoid 11 is energized, the two-way valve 34 moves to the right, to open line 17 to line 20 so that fluid is displaced into reservoir 26 as already described. The valve 34 also seals the cylinder 37 from the pressure line 17 so that fluid at the locking value of pressure is present at the large face A2 of the piston 36 and this fluid holds piston 36 to the right in spite of master cylinder pressure in line 4. When the solenoid 11 is de-energized at the end of the anti-lock period, braking pressure is immediately increased by movement of the piston 36 to the left until the value of braking pressure reaches a certain fraction of the master cylinder pressure in line 4, this fraction being determined by the ratio A1:A2 as determined by the respective areas of the large face A2 and the small face A1 of the piston 36. Thereafter, the braking pressure climbs to the locking value again, after sufficient fluid has passed restrictor 27 to re-bias piston 36 to the right at a rate determined by withdrawal (partial) of the restrictor 27 from bore 15 as already described. FIG. 4c illustrates the shape of braking pressure waveform which is achieved with this modification. In this waveform, the initial high rate at which braking pressure is increased again is indicated by the very steep slope s4, the braking pressure continuing at this rate up to an intermediate value P10 which is given by master cylinder pressure x ratio of A1/A2 and which persists for a time t6 to t7 which is the time taken for piston 36 to move fully to the right, following which the increasing master cylinder pressure starts to increase the braking pressure at a second slower rate up to the locking value P11. If the value of locking pressure is too low to move piston 36 to the right, this piston will adopt a position to the extreme left, where it is ineffective to provide a rapid pressure increase to an intermediate pressure and the system operates as already described without this modification.

A further modification of the system of FIG. 1 is shown in FIG. 3. The arrangement of FIG. 3 also uses a two-way valve 38 controlled by the solenoid 11 and is connected to lines 4, 17 and 20 as indicated. The two-way valve 38 is located in a housing 39 which is connected in series with a cylinder 40 between the master cylinder 1 and the brake 7. The cylinder 40 houses a spring-loaded piston 41 and has associated with it a flap valve 42 and a compressible resilient element 43. The valve 42 is normally closed due to the spring-loading applied to it from the spring-loaded piston 41. When the master cylinder 1 is actuated fluid pressure builds up in cylinder 40 and in the enclosure for valve 42, and resilient element 43 is compressed due to leakage of fluid past the stem of piston 41 in neck 45. When the solenoid 11 is energized, the two-way valve 38 moves to the right to interconnect line 17 with line 20 so that fluid can be displaced into the reservoir 26. This movement of valve 38 also seals fluid pressure initially at the locking value in cylinder 40 and element 43. When the solenoid 11 is subsequently de-energized the sealed-in fluid pressure falls to that in line 17, the resulting expansion of the resilient element 43 overcoming the spring-loading on piston 41 so as to displace the latter to the left and thereby open the flap valve 42. This allows fluid pressure to pass from line 4 to line 16 via a line 44 to increase braking pressure again rapidly. If there had been no leakage from element 43 through neck 45 during the anti-lock period, the braking pressure would rise almost to its original (locking) value before the valve 42 is closed again due to pressure build-up in cylinder 40 and element 43. However, due to leakage from element 43 through neck 45 during the anti-lock period the valve 42 closes at a lower braking pressure because it is re-seated earlier by piston 41 due to the reduced displacement of this piston by the fluid pressure remaining in element 43. In practice, it has been found that a long anti-lock period may provide only a small fractional rise of braking pressure, whereas a short anti-lock period allows a large fractional rise to nearer the original locking value.

In effect, the piston 41 acts as a one-way restrictor in that when fluid is flowing from left to right the piston 41 is restrained by its stem against the flap valve 42 which gives rise to a high pressure differential between opposite sides of the piston and hence a fast leak rate through the neck 45. On the other hand, when fluid flows from the right to the left the pressure differential is low between opposite sides of the piston and hence the leak rate is low. In this latter instance, the pressure differential would be zero but for the spring-loading on piston 41. The braking pressure waveform obtained with this modification is shown in FIG. 4d, in which waveform w4 shows an instant rapid increase of braking pressure up to a large fraction P12 of the locking value P13 due to a short anti-lock period (t8) and waveform w5 shows an instant rapid increase of braking pressure up to only a small fraction P14 of the locking value P15 due to a longer anti-lock period (t9). The second slower rate of pressure increase up to the locking value is determined by restrictor 27 in bore 15, and the master cylinder pressure.

The scavenging pump 12 in the system of FIG. 1 may be driven by means other than a cam revolving with the wheel. For example, it may be an electrically driven pump such as shown in FIG. 6, or driven by the vehicle engine such as shown in FIG. 5.

Seperate systems as shown in FIG. 1, with or without the modifications referred to, may be provided in respect of each road wheel of a vehicle as is shown in FIG. 7, but it would also be possible to provide a single system for two (rear) wheels driven by a vehicle propellor shaft for producing the electrical signals related to wheel speed as shown in FIG. 8. Furthermore, single anti-lock control unit with its solenoid, and with or without the modifications referred to may be provided in common for all the road wheels of a vehicle. In such a system, each road wheel would have its own speed sensor and associated electrical control unit, and any of the electrical control units thus provided would operate the solenoid to initiate anti-locking when the appertaining wheel tends towards a locked condition. Such a system could also employ an electrically-driven pump, or a pump driven by the vehicle engine rather than by a wheel-driven pump as in the system of FIG. 1.

In a practical realization of the brake pressure control unit 5 in the system of FIG. 1, this unit is preferably formed as a unitary block, with the appropriate bores and holes drilled therein to accomodate the moveable parts. Also, the block can be adapted to accommodate the solenoid, and also the modifications of FIGS. 2 or 3, when provided, to form a compact final structure.

With regard to the electrical control unit 10, it is envisaged that the first criterion to which it would respond to initiate an anti-lock period would normally be wheel deceleration being in excess of a predetermined value, as aforesaid. However, the second criterion which determines when the electrical control unit 10 terminates the anti-lock period may be any one of the following, instead of the particular second (1) criterion referred to above.

(2). When the wheel has reached maximum acceleration following the relieving of braking pressure, this criterion being synonymous with the wheel attaining the point of maximum adhesion following the relieving of braking pressure.

3. When the wheel deceleration no longer exceeds the pre-determined value of wheel deceleration.

4. When the wheel starts to accelerate or exceeds a predetermined acceleration following the relieving of braking pressure.

5. When the wheel has ceased to decelerate or the deceleration no longer exceeds a further predetermined value.

With regard to the second criteria (3), (4) and (5) set forth above, the electrical control unit 10 may be arranged such that it remains unresponsive when the particular second criterion obtains until a selected one of the following subsidiary criteria also obtains:

a. the wheel speed is not below a fixed reference speed.

b. the wheel speed is not below a fixed reference speed and also not below the speed it would have been doing if it had continued to decelerate at said predetermined value from the speed it was doing when the electrical control unit was rendered responsive.

c. the wheel speed is not below a chosen fraction of the speed it would have been doing if it had continued to decelerate at said predetermined value from the speed it was doing when the electrical control unit was rendered responsive.

d. the wheel speed is not a fixed amount below the speed it would have been doing if it had continued to decelerate at said predetermined value from the speed it was doing when the electrical control unit was rendered responsive.

The selection of the particular second criterion which determines when the electrical control unit 10 terminates the period would depend on the mode of operation of the anti-lock control unit 5 to increase braking pressure again. For example, for the mode of operation in accordance with FIG. 4b the second criterion (3), (4) or (5) would be suitable. It would also be possible to use the second criterion (4) for the mode of operation in accordance with FIG.4c or 4d, but only in respect of a high predetermined acceleration. The second criterion (4) with respect to the start of acceleration, and the second criteria (3) and (5) may not be suitable for the modes in accordance with FIG.4c or 4d, because with these modes of operation the rapid increase of braking pressure to the intermediate level could result in wheel locking. The second criterion (1) or (2) would be suitable for the modes of operation in accordance with FIG. 4c or 4d.

It is to be understood that the various means hereinbefore described for controlling the rate at which brakingpressure is increased again at the end of an anti-lock period may also be employed for achieving such control in anti-lock brake systems, other than a master cylinder type system employing a reservoir and a scavenging pump which has been chosen in the present instance to exemplify the invention. For example, in a continuously pumped hydraulic brake system the pressure line 4 would be connected to a pressure source of the system instead of to a master cylinder, and the pressure line 33 would be connected via the existing pump as provided for pumping fluid around the system. The invention may also be applied for effecting controlled actuation of a servo amplifier which controls braking pressure.

Co-pending application Ser. No. 884,551 describes an anti-lock circuit arrangement comprising different types of signal processing circuit which fulfil the circuit operations of the electrical control unit 10 of FIG. 1 with regard to the first and second and subsidiary criteria referred to previously.

What we claim is:

1. An anti-lock brake system for a wheeled vehicle comprising a fluid pressure source, a fluid pressure connection from said source to a wheel brake controlled by the system, an anti-lock control valve and actuator means for actuating the valve in response to an electrical output from a wheel sensor, a fluid connection from said brake, said fluid connection being adapted to be opened by said anti-lock control valve to allow fluid to be diverted from said brake through said fluid connection to thereby relieve braking pressure, and braking pressure control means operable as a consequence of fluid diverted through said fluid connection to control at least part of the rate at which braking pressure is increased when said anti-lock control valve is closed, said rate at which braking pressure is increased being controlled and dependent upon the volume of fluid displaced when braking pressure is relieved with respect to at least one anti-lock period, said braking pressure control means comprising a reservoir adapted to receive fluid diverted from the brake, variable restrictor means adapted to provide a variable restriction to flow of fluid in said fluid pressure connection, means for controlling said variable restrictor means in such manner as to determine the amount of restriction afforded thereby as a function of reservoir fluid volume, and a pump for extracting fluid from said reservoir, whereby said restriction is reduced, at the end of an anti-lock period at a rate determined by the volume of displaced fluid and the rate of pumping, second variable restrictor means coupled to the first and located in an outlet of said reservoir via which connection is made to said pump, said second restrictor means being effective to restrict the rate at which fluid is pumped from said reservoir by said pump so that the volume of fluid in said reservoir is reduced at a controlled rate.

2. A system as claimed in claim 1, wherein said first and second restrictors are both coupled to a plunger which is provided in said reservoir and is displaceable in accordance with the volume of fluid therein.

3. An anti-lock brake system for a wheeled vehicle comprising a fluid pressure source, a fluid pressure connection from said source to a wheel brake controlled by the system, an anti-lock control valve and actuator means for actuating the valve in response to an electrical output from a wheel sensor, a fluid connection from said brake, said fluid connection being adapted to be opened by said anti-lock control valve to allow fluid to be diverted from said brake through said fluid connection to thereby relieve braking pressure, and braking pressure control means operable as a consequence of fluid diverted through said fluid connection to control at least part of the rate at which braking pressure is increased when said anti-lock control valve is closed, and rate at which braking pressure is increased being controlled and dependent upon the volume of fluid displaced when braking pressure is relieved with respect to at least one anti-lock period, said braking pressure control means comprising a reservoir adapted to receive fluid diverted from the brake, variable restrictor means adapted to provide a variable restriction to flow of fluid in said fluid pressure connection, means for controlling said variable restrictor means in such manner as to determine the amount of restriction afforded thereby as a function of reservoir fluid volume, and a pump for extracting fluid from said reservoir, whereby said restriction is reduced, at the end of an anti-lock period at a rate determined by the volume of displaced fluid and the rate of pumping, and "fail-safe" means for sealing the reservoir outlet from said pump during the time that said anti-lock control valve is actuated.

4. A system as claimed in claim 3, wherein said "fail-safe" means comprises a plunger which is located adjacent the reservoir outlet and between said reservoir and the fluid connection from the latter to said anti-lock control valve, said plunger being displaceable by fluid pressure in the fluid connection when the anti-lock control valve is actuated to seal the reservoir outlet from the pump.

5. A system as claimed in claim 4, wherein said plunger is so dimensioned as to permit flow of fluid past it from said fluid connection into said reservoir, and wherein displacement of said plunger to seal the reservoir outlet causes an immediate volume of fluid to be displaced into said reservoir, followed by a slower increase of said volume as fluid thereafter has to pass said plunger to enter the reservoir.

6. An anti-lock brake system for a wheeled vehicle comprising a fluid pressure source, a fluid pressure connection from said source to a wheel brake controlled by the system, an anti-lock control valve and actuator means for actuating the valve in response to an electrical output from a wheel sensor, a fluid connection from said brake, said fluid connection being adapted to be opened by said anti-lock control valve to allow fluid to be diverted from said brake through said fluid connection to thereby relieve braking pressure, and braking pressure control means operable as a consequence of fluid diverted through said fluid connection to control at least part of the rate at which braking pressure is increased when said anti-lock control valve is closed, said rate at which braking pressure is increased being controlled and dependent upon the volume of fluid displaced when braking pressure is relieved with respect to at least one anti-lock period, said braking pressure control means comprising a reservoir adapted to receive fluid diverted from the brake, variable restrictor means adapted to provide a variable restriction to flow of fluid in said fluid pressure connection, means for controlling said variable restrictor means in such manner as to determine the amount of restriction afforded thereby as a function of reservoir fluid volume, and a pump for extracting fluid from said reservoir, whereby said restriction is reduced, at the end of an anti-lock period at a rate determined by the volume of displaced fluid and the rate of pumping, and an auxiliary fluid pressure connection from said pressurized fluid source to said anti-lock control valve, said auxiliary fluid pressure connection having a housing portion in which is slidably accommodated a differential piston presenting a small area face towards said pressurized fluid source and a large area face towards said anti-lock control valve, the arrangement being such that when said anti-lock control valve is unactuated it allows connection between said fluid pressure connection and the large area face of the differential piston so that the latter is displaced towards the pressurized fluid source despite the fluid pressure from the latter due to the differential effect afforded by the respective areas of the piston faces, whereas when the anti-lock control valve is actuated it seals the fluid pressure connection from the large face of the piston so that fluid pressure at the locking value of pressure is present at the large face, with the result that when the anti-lock control valve is released at the end of an anti-lock period, braking pressure is immediately increased by movement of the piston towards the fluid pressure connection at a first, relatively high rate until the value of braking pressure reaches a certain fraction of the pressure of the pressurized fluid source, said fraction being determined by the ratio of the area of the small face of the piston to that of the large face of the piston and braking pressure thereafter increasing at a second slower, rate.

7. A system as claimed in claim 6, wherein the ratio of said piston faces is about 1 : 2.

8. An anti-lock brake system for a wheeled vehicle comprising a fluid pressure source, a fluid pressure connection from said source to a wheel brake controlled by the system, an valve and interconnected with said first housing portion by a neck portion, a stem of said piston extending through said neck portion and having the flap valve secured to it, and the flap valve controlling the passage of fluid from said pressurized fluid source to said brake via a second auxiliary fluid pressure connection, the arrangement being such that when said anti-lock control valve is actuated, it seals fluid pressure at the locking value in said first housing portion and in said resilient element at opposite sides of said piston respectively, the fluid pressure in said resilient element leaking through said neck portion during the anti-lock period to a final value, as determined by the length of this period, whereby when said anti-lock control valve is released at the end of the period and fluid pressure in said first housing is relieved, the fluid pressure remaining in the resilient element displaces said piston against its spring-loading to an extent determined by its final value, thereby opening the flap valve a corresponding extent, so that fluid pressure from said pressurized fluid pressure source passes via said second auxiliary fluid pressure connection to increase braking pressure at a high rate until the flap valve is closed again, and then at a second, slower rate.

9. An anti-lock brake system for a wheeled vehicle comprising a fluid pressure source, a fluid pressure connection from said source to a wheel brake controlled by the system, an anti-lock control valve and actuator means for actuating the valve in response to an electrical output from a wheel sensor, a fluid connection from said brake, said fluid connection being adapted to be opened by said anti-lock control valve to allow fluid to be diverted from said brake through said fluid connection to thereby relieve braking pressure, and braking pressure control means comprising a reservoir for receiving fluid diverted from the brake, means connecting said reservoir to said fluid connection for diverting fluid from the brake, restrictor means adapted to provide a restriction to flow of fluid in said fluid pressure connection when fluid is diverted from said brake, means for controlling said restrictor means so as to vary the amount of restriction produced thereby between maximum, minimum and intermediate values as a function of reservoir fluid volume thereby controlling at least part of the rate at which braking pressure is increased when said anti-lock control valve is closed, said means for controlling said restrictor means being connected thereto and includes means responsive to the volume of fluid displaced for controlling the rate at which braking pressure is increased.

10. A system as claimed in claim 9 further comprising a pump for extracting fluid from said reservoir said restriction thereby being reduced at the end of an anti-lock period at a rate determined by the volume of displaced fluid and the rate of pumping.

11. A system as claimed in claim 10 in which said pump is driven by a vehicle wheel to which the system is applied whereby the pumping action is at a rate which is related to wheel rotational speed.

12. A system as claimed in claim 9 in which the anti-lock control valve is a solenoid actuated valve having characteristics such that it acts as a pressure relief valve, the opening value thereof being dependent on solenoid current and set such that at zero current it will remain closed at the maximum braking pressure of the system but will be fully open when energizing current is applied to it for a time greater than a certain minimum, whereby to provide a fluid pressure leak path between said fluid pressure connection and said fluid connection, at a time immediately before each anti-lock cycle, to cause a slight relieving of braking pressure at this time, whereby to "tail-off" the rate of braking pressure increase between one anti-lock cycle and the next.

13. A system as claimed in claim 9 including an electrical control unit for effectuating actuation of said anti-lock control valve in response to electrical signals from said wheel sensor.

14. An anti-lock vehicle brake system as claimed in claim 9 provided for each road wheel of a vehicle.

* * * * *